(No Model.) 2 Sheets—Sheet 1.
J. T. VAN GESTEL.
MOTIVE APPARATUS AND TIME INDICATOR FOR USE WITH SECONDARY BATTERIES.
No. 406,975. Patented July 16, 1889.
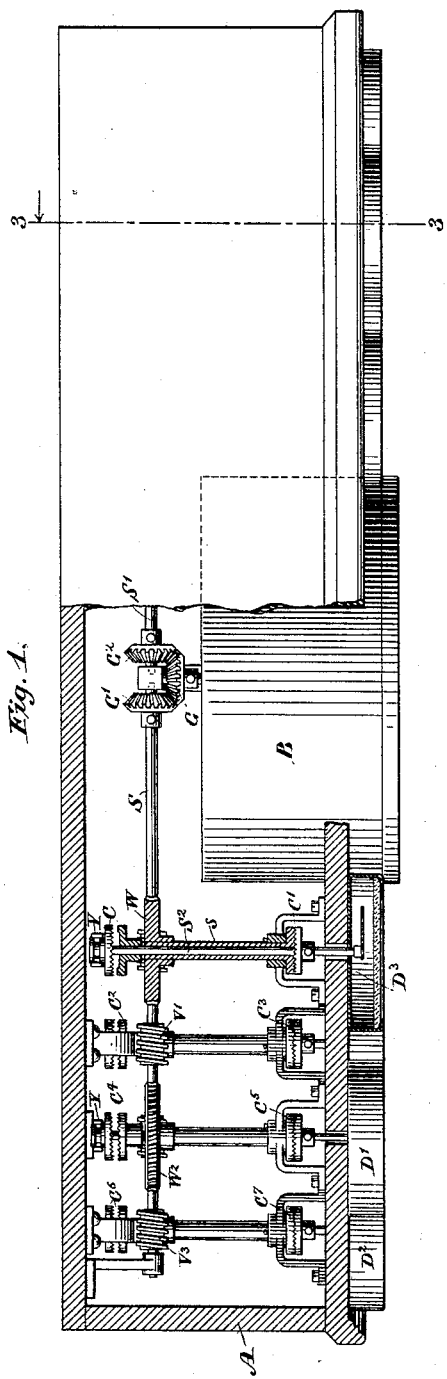
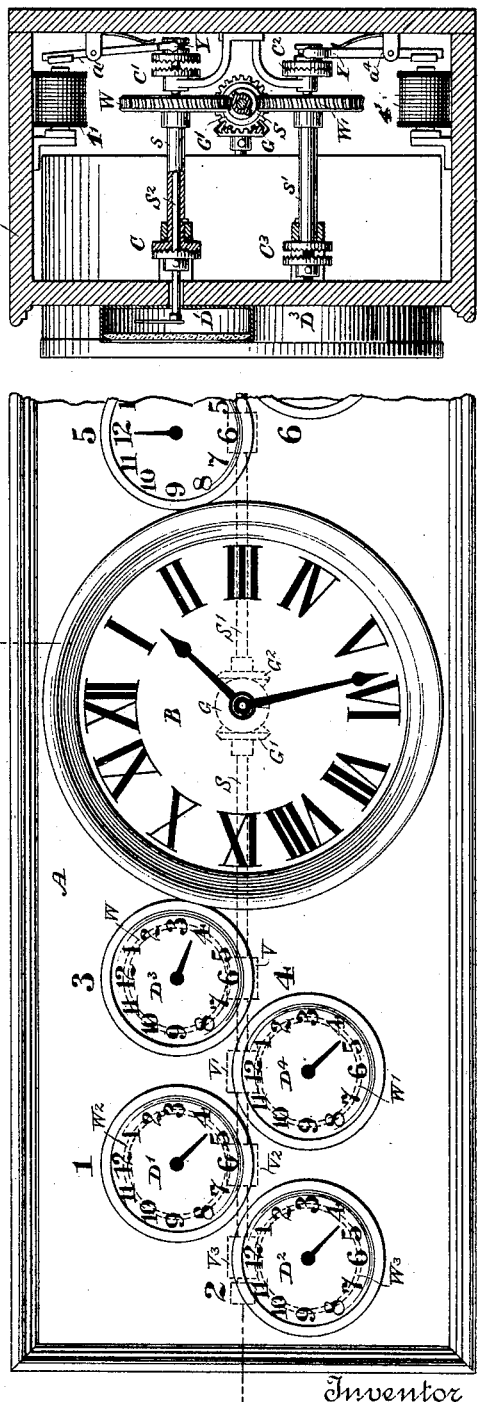
Witnesses
Geo. W. Breck
Edward Thorpe
Inventor
Jean Theodore van Gestel
By his Attorneys
Wiedersheim & Kintner

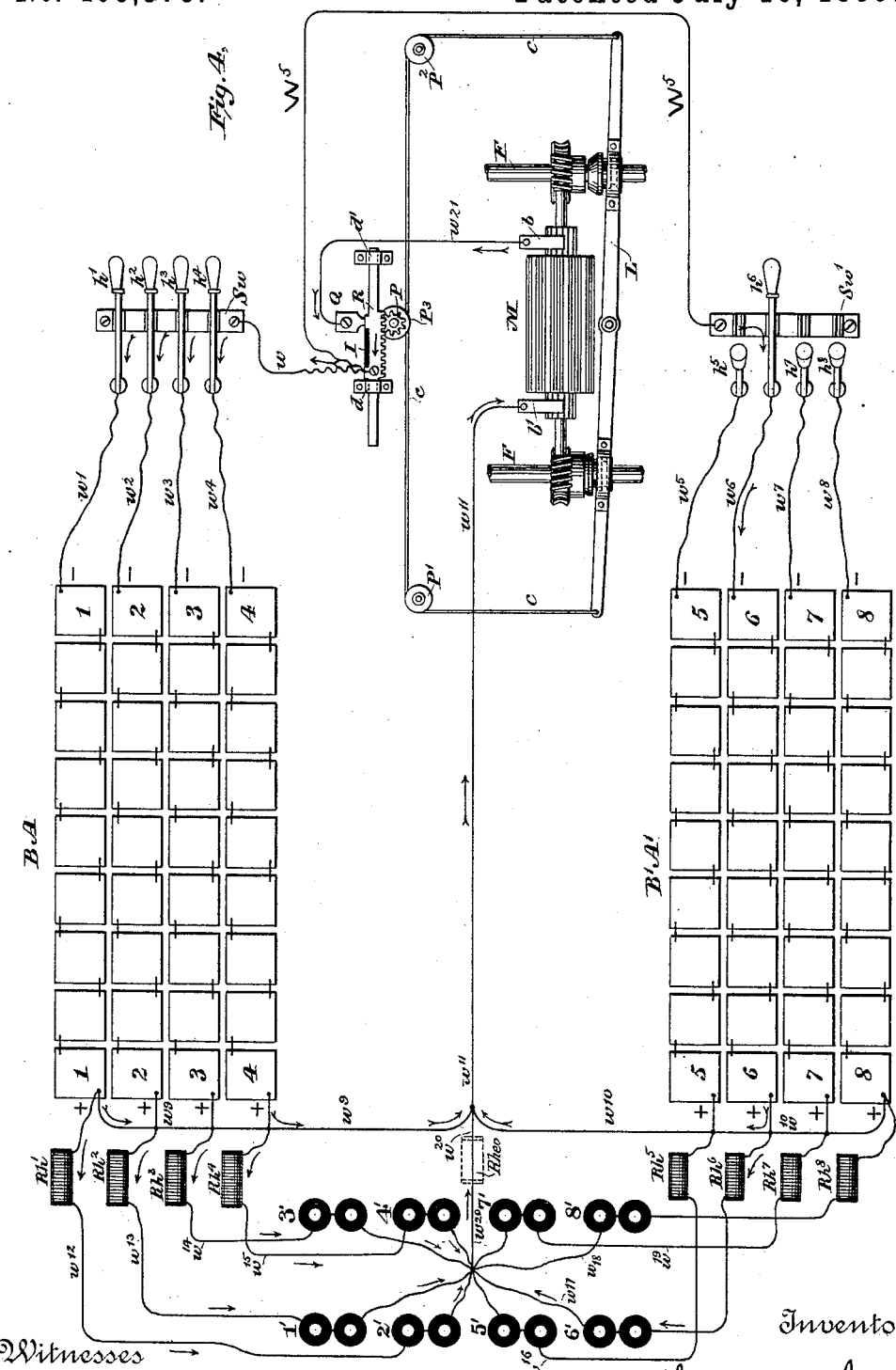

UNITED STATES PATENT OFFICE.

JEAN THEODORE VAN GESTEL, OF NEW YORK, N. Y.

MOTIVE APPARATUS AND TIME-INDICATOR FOR USE WITH SECONDARY BATTERIES.

SPECIFICATION forming part of Letters Patent No. 406,975, dated July 16, 1889.

Application filed September 15, 1888. Serial No. 285,487. (No model.)

*To all whom it may concern:*

Be it known that I, JEAN THEODORE VAN GESTEL, a subject of the King of the Netherlands, residing in New York, county of New York, and State of New York, have invented a new and useful Improvement in Apparatus for Use in Connection with Secondary or Storage Batteries, of which the following is a specification.

My invention relates particularly to improvements in apparatus for connecting and disconnecting storage-batteries or other sources of electrical energy to and from motors or analogous transmitting devices, and to time-indicators for use therewith; and its objects are, first, to readily connect and disconnect a motor from the battery or operating electrical circuit at the same instant that it is mechanically connected or disconnected from the device it is operating or propelling—in the present instance a motor-car adapted for use in propelling tram-cars or analogous vehicles; second, to concentrate and simplify the apparatus for thus controlling the operation of the motor through the agency of its mechanical and electrical connections as much as possible, and, third, to indicate to the attendant at any instant, through the agency of a clock mechanism, the exact length of time that any portion of the battery has been in service, thus affording him an index of the condition of his motive power. I accomplish these objects by the mechanism hereinafter described, but particularly pointed out in the claims which follow this specification.

In a prior application filed by me in the United States Patent Office on the 12th day of September, 1888, bearing Serial No. 285,174, I have shown, described, and claimed a novel and improved motor-car for propelling tram-cars or analogous vehicles. In that application I have based claims particularly upon the construction of the car and its arrangements for carrying the motive power or stored energy as therein disclosed, said stored energy being of any type, preferably electrical storage-batteries. I have also shown, described, and claimed therein novel apparatus for connecting and disconnecting the motor, by preference an electrical motor, to or from the car-axle through the agency of clutches and worm-gear in such manner as to propel it in either direction at will. This connecting mechanism is partially shown in the present application in Fig. 4 of the drawings, and I make no claim, therefore, to such features here, they being simply shown in the present application to disclose more fully the operative relation between the propelling-motor, the batteries, and the time mechanism referred to in the objects of invention above noted.

My invention will be fully understood by referring to the accompanying drawings, in which like letters of reference wherever used represent like parts of the apparatus.

Figure 1 is a plan view, partly in section, of the clock mechanism and its operative mechanical connections with the indicating-dials. Fig. 2 is a partial side elevation of the same. Fig. 3 is a cross-section on line 3 3, Fig. 1. Fig. 4 is a diagrammatic view showing all of the electrical connections.

B is a clock mechanism, of any preferred form, having minute and hour hands, with dial, as shown, and secured in a casing or box A, located in close proximity to the attendant, as shown in my aforesaid prior application. The hour-hand shaft carries at its rear end a bevel gear-wheel G, meshing with two similar gear-wheels $G'$ $G^2$, fixed to shafts S S', journaled and supported in the rear of the casing A. These shafts have fixed to them at proper intervals worms or screws $V'$ $V^3$, &c., four on each, which mesh, respectively, with independent worm-gears W $W^2$, &c., one for each, secured on loose sleeves $s$ $s'$, &c., which in turn are carried by counter-shafting $S^2$, &c., journaled to the front and rear of the casing. These sleeves have clutches C $C'$ $C^2$ $C^3$, &c., at their opposite ends, with inwardly-projecting teeth adapted to mesh with corresponding clutch-teeth fixed securely to the counter-shafting and shafting-supports, respectively, so that said counter-shafting is either connected to the sleeves or the frame, dependent upon the position of the clutches. Each counter-shaft carries a dial-hand adapted to rotate over its respective dial 1, 2, 3, or 4, &c., divided, as shown, into twelve portions, each representing one hour of time, the gearing being so related from the clock hour-hand shaft to the dial or counter-shafts that for each hour indicated on the clock-dial an hour will be indicated on any or all dials dependent upon their connection with said clock, as will be explained.

1' 2' 3', &c., to 8' are electro-magnets. (Shown in the diagram in Fig. 4, and in actual position in Fig. 3.) These magnets have armatures $a'$ $a^4$, &c., pivoted to the casing, and provided with forked free ends adapted to grasp the clutches on the ends of the counter-shafts and cause said shafts to assume either of two positions—viz., stationary, or in mechanical connection with the worm-gear, and hence the clock mechanism.

I will now describe the electrical connections of the entire apparatus.

M is an electrical motor, having its armature connected, through worm-gear in this instance, to the axles F F of a car.

L is the clutch-shifting lever, connected at its ends by a cord $c$, running over pulleys P' P² to a fixed pulley P³, located on a vertical operating-shaft, carrying also a pinion P, which meshes with a rack R, adapted to slide in guideways or eyes $d$ $d'$. This mechanism, as before indicated, is fully described in my prior application, and needs no further mention here.

Q is a contact-spring resting against the back of the rack R, and adapted to make electrical contact therethrough, or to ride over an insulating-block I and break said contact, according to the wish of the attendant or operator.

B A and B' A' are a series of electrical generators, preferably storage-batteries, arranged in tiers or rows 1 2 3 4, &c., preferably enough in each row to furnish sufficient electro-motive force to overcome a fixed resistance in the nature of a given translating device, in this instance a motor M.

$Sw$ and $Sw'$ are switches, preferably of the jackknife type, having independent knife or blade switches $h'$ $h^2$ $h^3$, &c., to $h^8$, connected each by its own wire $w'$ $w^2$ $w^3$ $w^4$ $w^5$, &c., to $w^8$, to its own series of batteries 1, 2, 3, 4, or 5, &c., to 8. The switch-frames $Sw$ and $Sw'$ are connected by wires $w$ and $W^5$ directly to the sliding rack R, and it in turn is connected, through the contact-spring Q and wire $w^{21}$, to one of the commutator-brushes $b$ of the motor M. The several series of batteries 1 2 3 4 and 5 6 7 8 are connected by independent return-wires $w^9$ and $w^{10}$ to a common return-wire $w^{11}$, which in turn connects directly to the other brush $b'$ of the motor M.

$Rh'$ $Rh^2$, &c., to $Rh^8$, inclusive, are rheostats located in independent derived or branch circuits $w^{12}$ $w^{13}$ $w^{14}$, &c., to $w^{19}$, inclusive, which circuits include, respectively, the electro-magnets for manipulating the dial-shafts, and are connected, as shown, by a common return-wire $w^{20}$ to the wire $w^{11}$.

In place of a rheostat in each circuit I may use a single rheostat $Rheo$ in the common return-wire $w^{20}$.

The operation of this apparatus is as follows: Suppose the motor-shaft connected to the car-axles F F through the agency of the clutch mechanism, and the switches $h'$, $h^2$, $h^3$, $h^4$, and $h^6$ to be in the position shown. The circuit will be closed, as follows: Starting from the rack R, as shown by the tailed arrows for the upper sets of batteries, by wire $w$, switches $h'$, $h^2$, $h^3$, and $h^4$, wires $w'$, $w^2$, $w^3$, and $w^4$, the several series of batteries 1, 2, 3, and 4, wire $w^9$, return-wire $w^{11}$, brush $b'$, motor M, brush $b$, wire $w^{21}$, contact Q, and rack R. The lower set of batteries 6 of B' A' is in multiple-arc circuit with the other batteries through the motor as follows: Starting, as before, from rack R, by wire $w'$, switch $Sw'$, knife-switch $h^6$, wire $w^6$, section 6 of battery, wire $w^{10}$, and return-wire $w^{11}$, through the motor to starting-point. The switches $h^5$, $h^7$, and $h^8$ are open, and hence the sections 5, 7, and 8 of the lower series of batteries are out of action. It will thus be seen that any one or all of the sets of batteries 1, 2, 3, 4, 5, 6, 7, and 8 can be put in or out at pleasure, and that it can also be cut out entirely at the will of the attendant by placing the rack R in such position that the insulating-block I is beneath the contact Q.

I will now describe the operation of the time-indicator apparatus.

The magnets 1' 2' 3', &c., to 8', being located in high-resistance derived circuits, due to the resistance of the rheostats $Rh'$ $Rh^2$, &c., or $Rheo$, take only sufficient current from the operating circuits when closed, as described, to energize them. By this action their armatures are drawn up, and they are operatively connected to the counter-shafts $S^2$, &c., causing them to rotate with the hour-hand of the clock B, thus showing how long any particular battery has been in use. It will thus be seen that each indicator is entirely independent of every other, and is always in condition to be operatively connected whenever its particular section of battery is put in use. In this manner I provide a simple and efficient safeguard against the possibility of the battery being run down without the knowledge of the attendant.

Having thus described my invention, what I claim, and desire to secure by Letters Patent of the United States, is—

1. The combination of an electrical motor, a clutch for connecting the armature-shaft of said motor to mechanism to be driven, mechanism connected to said clutch for operating it, a generator of electricity, and electrical connections operatively attached to the clutch-controlling mechanism for connecting and disconnecting said generator to and from the motor at the same time that the armature is connected or disconnected to and from the mechanism to be driven, substantially as described.

2. The combination of the following elements: an electrical motor having its armature connected by clutch mechanism to one or more axles or shafts of mechanism to be driven, a clutch-operating shaft and lever for connecting and disconnecting said parts, an electrical generator for operating said motor, electrical connections carried by a rack geared to said shaft for connecting and disconnecting said battery to and from the motor at the same time the clutch mechanism is operated, substantially as described.

3. The combination of the following elements: an electrical motor, a battery divided into sections having multiple-arc connection at one end to one pole of said motor, a series of switches, one for each section of battery, said switches having a common connection to the remaining poles of the battery and motor, clutch mechanism for connecting the armature of the motor to mechanism to be driven, mechanical connections for manipulating said clutch mechanism, and a circuit-controller connected to the clutch-operating mechanism for making and breaking the circuit from the battery to the motor at the same time the armature thereof is connected or disconnected from the mechanism to be driven, substantially as described.

4. The combination of two or more series of storage-batteries or analogous electrical generators, a translating device as a motor, a switch for each series of generators, a time mechanism having mechanical connection with a series of dial-indicators, one for each series of generators, a magnet for each series of dial-indicators, said magnets being in circuit with their respective batteries, and mechanical connection between the armatures of the magnets, the dial-indicator shafts, and the clock mechanism for operatively connecting or disconnecting said dial-indicators according as the batteries are cut in or out, substantially as described.

5. The combination of two or more series of storage-batteries having multiple-arc connection at one end of each series to one pole of a motor, with multiple-arc connections from the other end through individual switches, and a single conductor to the remaining pole of the motor, with a time mechanism operatively connected to a main shaft, and electromagnets located in derived circuits from the first-named several multiple-arc branches and connections in the nature of clutch mechanism between the armatures, the dial-shafts, and the clock-motor shaft, substantially as described.

6. The combination of the following elements: a generator of electricity in circuit with a motor having its armature connected normally to loose-running worm-gear, a mechanical clutch for connecting said armature to a car-axle, a series of levers and connections for operating said clutch mechanism, electrical connections attached to the clutch-operating mechanism for connecting and disconnecting the generator to and from the circuit, and a time-indicator controlled by a magnet located in the battery-circuit, the whole being connected and operating substantially as described.

7. In an apparatus for propelling tram-cars or analogous vehicles, the combination of the following elements: a motor operatively connected by loose running-gear to one or more car-axles, a clutch mechanism, a series of levers, pulleys, and connecting mechanism for operating said clutch mechanism and connecting and disconnecting the motor and the car-axle, a circuit-controller in circuit with a battery for connecting and disconnecting said battery and motor electrically, a time mechanism having a shaft geared to its hour-hand shaft, a dial-hand attached to a counter-shaft normally disconnected from the first-named shaft, intervening clutch mechanism for connecting the shaft and counter-shafting, an armature-lever connected to said clutch mechanism, and an electro-magnet energized by the current from the battery when operatively connected to the motor, substantially as described.

8. In an apparatus for propelling tram-cars or analogous vehicles by electricity, the combination of the following elements: a motor operatively connected to one or more axles of the car by clutch mechanism, levers and connections for manipulating said clutch-mechanism, a circuit-controller attached to the clutch-controlling mechanism, a series of batteries having multiple-arc connection through the motor, independent switches for controlling the independent series of battery, a time mechanism, a dial-indicator, one for each series of battery, an electro-magnet operatively connected to each dial-indicator shaft and adapted to be connected or disconnected to a shaft of the time mechanism, said electro-magnets being located in derived circuits from their respective battery-circuits, substantially as described.

JEAN THEODORE VAN GESTEL.

Witnesses:
C. J. KINTNER,
J. F. QUINN.